(12) United States Patent
Xu et al.

(10) Patent No.: US 12,333,522 B1
(45) Date of Patent: Jun. 17, 2025

(54) CHECKOUT DEVICES

(71) Applicant: Shanghai Ant Chuangjiang Information Technology Co., Ltd., Shanghai (CN)

(72) Inventors: Youchao Xu, Hangzhou (CN); Zhiyuan Chen, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/931,970

(22) Filed: Oct. 30, 2024

Related U.S. Application Data

(63) Continuation of application No. PCT/CN2024/118698, filed on Sep. 13, 2024.

(30) Foreign Application Priority Data

Feb. 6, 2024 (CN) .......................... 202420285909.5

(51) Int. Cl.
| | |
|---|---|
| G06Q 20/32 | (2012.01) |
| G06Q 20/20 | (2012.01) |
| G07G 1/00 | (2006.01) |
| G07G 1/01 | (2006.01) |

(52) U.S. Cl.
CPC ....... *G06Q 20/3278* (2013.01); *G06Q 20/208* (2013.01); *G07G 1/0018* (2013.01); *G07G 1/0036* (2013.01); *G07G 1/01* (2013.01)

(58) Field of Classification Search
None
See application file for complete search history.

(56) References Cited

U.S. PATENT DOCUMENTS

2023/0121126 A1* 4/2023 Andler ................ F16M 11/105
235/383

* cited by examiner

*Primary Examiner* — Scott S Trotter
*Assistant Examiner* — Amit Patel
(74) *Attorney, Agent, or Firm* — Fish & Richardson P.C.

(57) ABSTRACT

Implementations of this application provide a checkout device, including a housing, a display screen, and a near-field communication (NFC) module. The housing includes a support portion for support of the housing on a countertop. The display screen is fastened to the housing, and when the checkout device is used, the display screen faces a consumer. The NFC module is located in space enclosed by the housing, and located to permit an electronic device to make an electronic payment.

8 Claims, 4 Drawing Sheets

CHECKOUT DEVICES

CROSS-REFERENCE TO RELATED APPLICATIONS

This application is a continuation of PCT Application No. PCT/CN2024/118698, filed on Sep. 13, 2024, which claims priority to Chinese Patent Application No. 202420285909.5, filed on Feb. 6, 2024, and each application is hereby incorporated by reference in its entirety.

TECHNICAL FIELD

This application relates to the field of electronic payment technologies, and in particular, to checkout devices.

BACKGROUND

With the rapid development of Internet technologies, electronic transactions have entered people's lives. However, an existing checkout device requires a merchant to hold a code scanner to scan a payment code of a user or requires a user to align a mobile terminal with a code scanning window of the checkout device, to complete a payment. This takes up time of the merchant and reduces checkout efficiency.

SUMMARY

This application provides checkout devices, to improve checkout efficiency.

Some implementations of this application provide a checkout device, including: a housing, including a support portion, to be supported on a countertop; a display screen, fastened to the housing, where when the checkout device is used, the display screen faces a consumer; and a near-field communication (NFC) module, located in space enclosed by the housing, to be close to an electronic device to make an electronic payment.

Further, when the support portion is supported on the countertop, the display screen is disposed inclined relative to a vertical direction.

Further, the housing includes a main body housing, the support portion includes a first support portion and a second support portion that are connected to the main body housing, the first support portion is in a flat plate shape, to be supported on the countertop, and the second support portion is columnar and includes a bottom surface disposed inclined, to be supported on the countertop.

Further, two adjacent ends of the first support portion are respectively connected to the main body housing and the second support portion.

Further, the display screen and the NFC module are sequentially disposed in a length direction of the main body housing, and a length direction of the display screen is consistent with the length direction of the main body housing.

Further, the checkout device includes an indicator, the indicator forms a ring, and emitted light surrounds the NFC module.

Further, the housing includes a top cover fastened to the main body housing, the NFC module is fastened to the top cover, the NFC module and the indicator are located between the top cover and the main body housing, and the top cover is light-transmissive for light emitted by the indicator to transmit.

Further, the top cover is provided with guiding text, and the guiding text is light-transmissive for the light emitted by the indicator to transmit.

Further, the checkout device includes a speaker located in the space enclosed by the housing, and a sound output hole is disposed on the housing for a sound emitted by the speaker to pass through.

Further, the checkout device includes a scanning apparatus, and the scanning apparatus is located at an end that is of the display screen and that is far away from the NFC module.

In the implementations of this application, compared with code scanning payment, disposition of the NFC module in the checkout device makes it more convenient to make a payment, and improves payment efficiency. The display screen is disposed in the checkout device, and can be configured to display a to-be-paid amount of a product and/or payment method guidance and/or a payment result. The payment method guidance can direct the consumer to quickly make an electronic payment, so as to improve payment efficiency. The to-be-paid amount of the product and the payment result are displayed. The consumer does not need to consult a merchant about the to-be-paid amount and whether the payment is completed. This frees the merchant, improves payment efficiency, and improves consumer experience.

DESCRIPTION OF EMBODIMENTS

Figure 1:
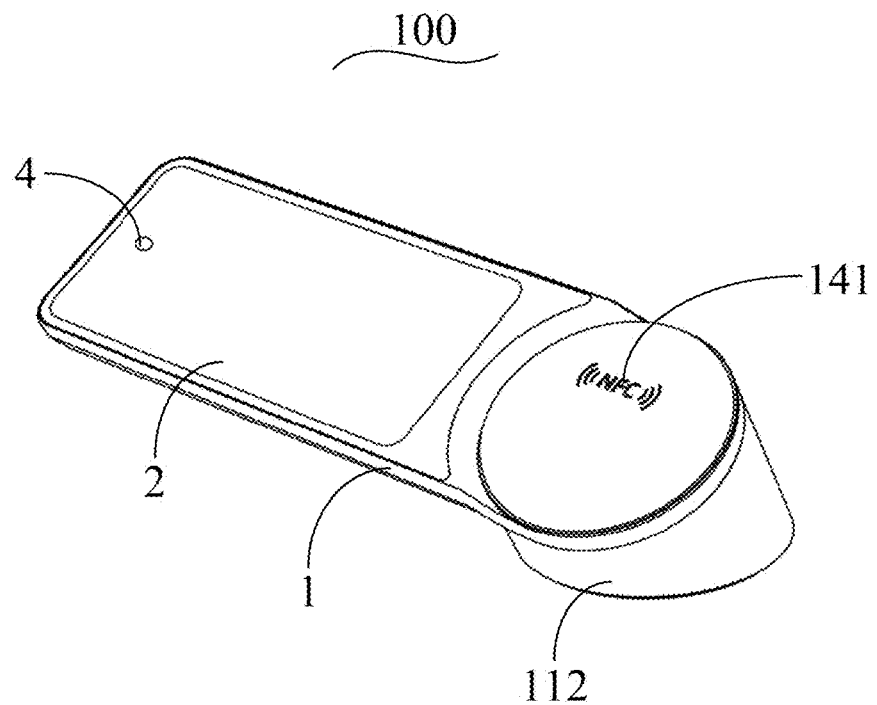
FIG. 1 is a schematic diagram illustrating a checkout device, according to some example implementations of this application.
Figure 2:
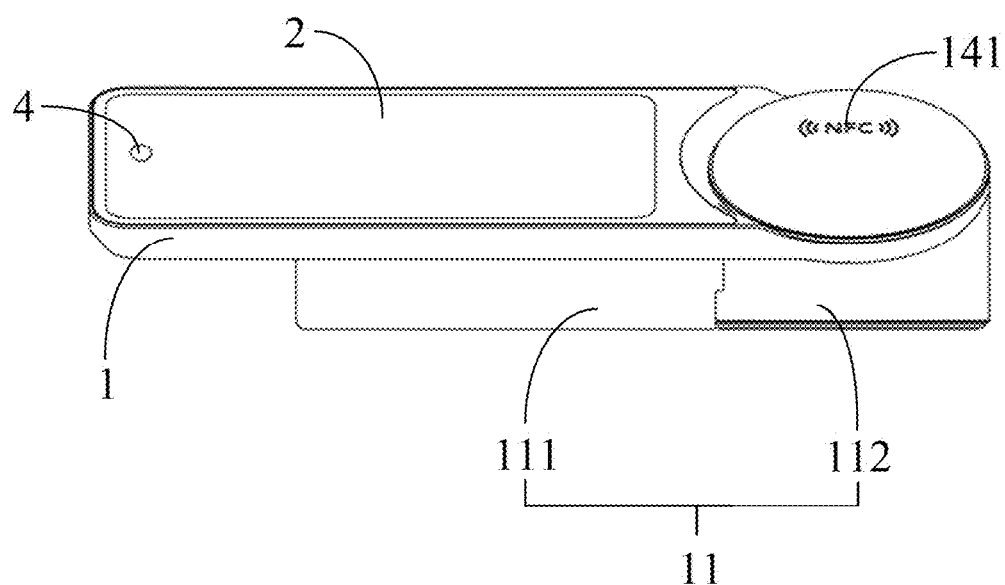
FIG. 2 is a front view illustrating the checkout device shown in FIG. 1.
Figure 3:
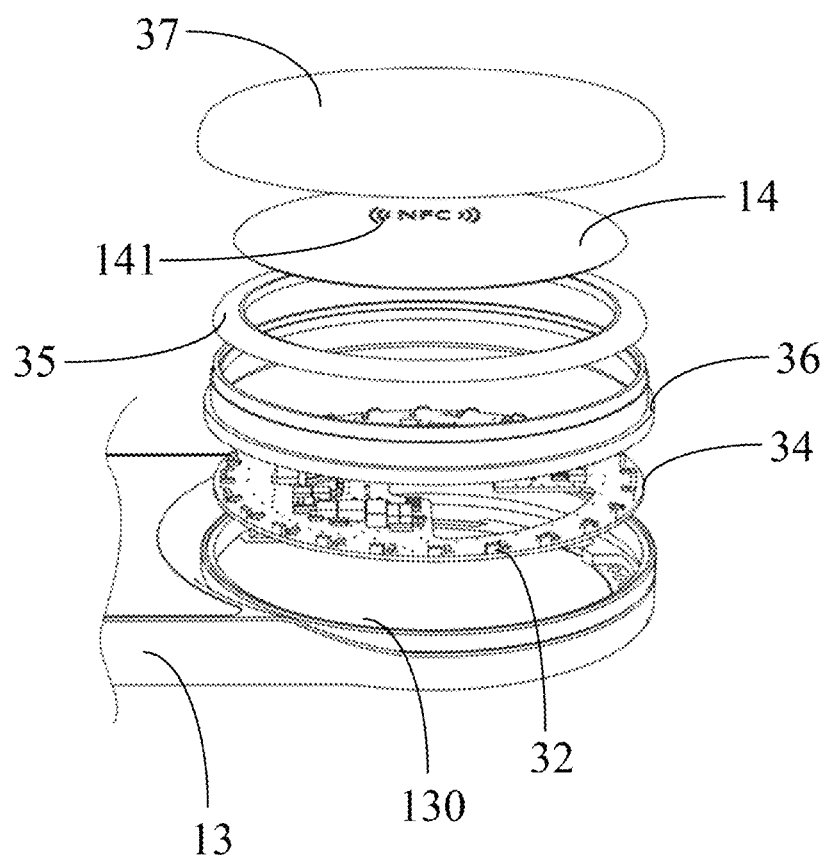
FIG. 3 is an exploded view illustrating the checkout device shown in FIG. 1, where only a part of the checkout device is shown.
Figure 4:
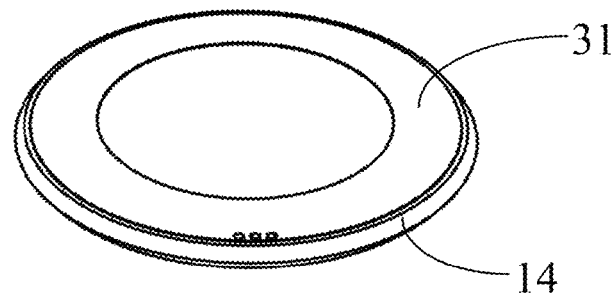
FIG. 4 is a schematic diagram illustrating a top cover of the checkout device shown in FIG. 3.
Figure 5:
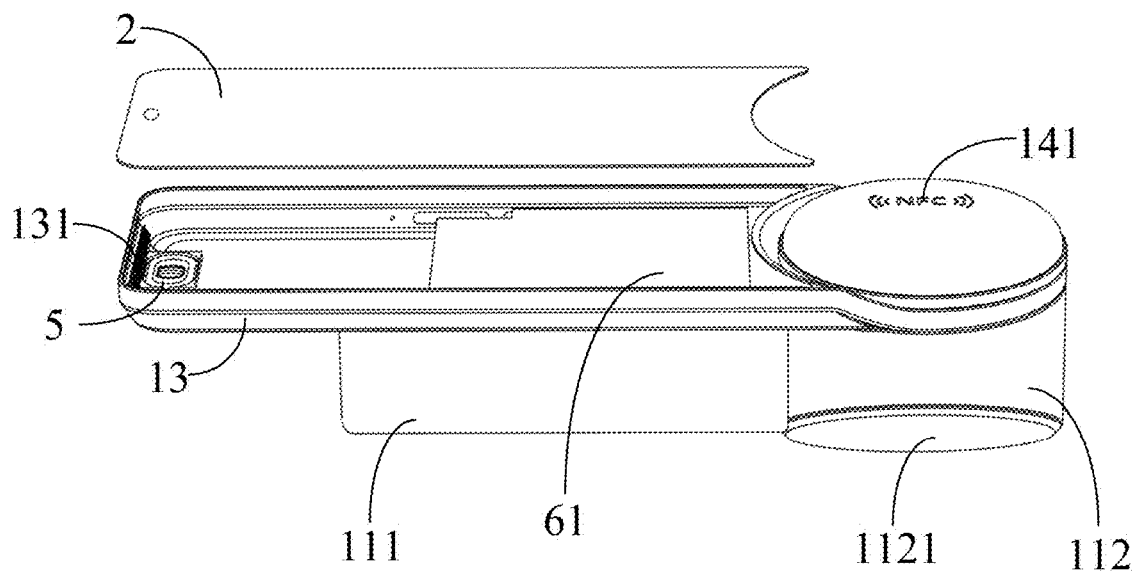
FIG. 5 is another exploded view illustrating the checkout device shown in FIG. 1.

Example implementations are described in detail here, and examples of the example implementations are presented in the accompanying drawings. When the following descriptions are associated with the accompanying drawings, unless specified otherwise, the same numbers in different accompanying drawings represent the same or similar elements. The implementations described in the following example implementations do not represent all implementations consistent with this application. On the contrary, the implementations are merely examples of apparatuses and methods consistent with some aspects of this application and described in detail in the appended claims.

User information (including but not limited to user equipment information, personal user information, etc.) and data (including but not limited to data used for analysis, stored data, displayed data, etc.) in this application are information and data that are authorized by a user or that are fully authorized by each party. Furthermore, related data need to be collected, used, and processed in compliance with relevant laws, regulations and standards of relevant countries and regions, and corresponding operation entries are provided for the user to choose to authorize or reject.

Terms used in this application are merely intended to describe specific implementations, but are not intended to limit this application. Terms "a", "the", and "this" in singular forms in this application and the appended claims are also intended to include plural forms, unless otherwise stated in the context clearly. It should be further understood that the term "and/or" used in this specification indicates and includes any or all possible combinations of one or more associated listed items.

It should be understood that although terms "first", "second", "third", etc. may be used in this application to describe various types of information, the information should not be limited to the terms. These terms are merely used to distinguish between information of the same type. For example, without departing from the scope of this application, first information can also be referred to as second information, and similarly, the second information can also be referred to as the first information. Depending on the context, the word "if" used here can be interpreted as "when" or "while" or "in response to determining".

As shown in FIG. 1 to FIG. 5, a checkout device 100 in some implementations of this application includes a housing 1, a display screen 2, and an NFC module 31. The NFC module 31 is located in space enclosed by the housing 1, to be close to an electronic device to make an electronic payment. Compared with code scanning payment, it is more convenient to make a payment, and payment efficiency is improved. The electronic device includes but is not limited to a mobile phone, a tablet, etc.

The display screen 2 is fastened to the housing 1. When the checkout device 100 is used, the display screen 2 faces a consumer, and can be configured to display a to-be-paid amount of a product and/or payment method guidance and/or a payment result. The payment method guidance can direct the consumer to quickly make an electronic payment, so as to improve payment efficiency. The to-be-paid amount of the product and the payment result are displayed. The consumer does not need to consult a merchant about the to-be-paid amount and whether the payment is completed. This frees the merchant, improves payment efficiency, and improves consumer experience.

The housing 1 includes a support portion 11, to be supported on a countertop. When the support portion 11 is supported on the countertop, the display screen 2 is disposed inclined relative to a vertical direction, to help the consumer view the display screen 2.

In some implementations, the payment method guidance displayed on the display screen 2 includes an image, text, an animation, etc.

In some implementations, the display screen 2 provides picture guidance, and the picture includes a jump image that displays the to-be-paid amount. After the electronic payment is completed, the jump image moves in a direction of being close to the electronic device and disappears from the display screen 2, to achieve a similar effect of jumping from the display screen 2 to a payment device by the jump image, so as to improve payment experience.

In some implementations, the jump image can be implemented through animation switching.

In some implementations, the jump image can be spherical, to make the jump more vivid.

In some implementations, the checkout device 100 includes an indicator 32, the indicator 32 forms a ring, and emitted light surrounds the NFC module 31, to provide light guidance. This can attract attention of the consumer, to improve payment efficiency.

In some implementations, when the checkout device 100 is in different states, the indicator 32 can provide different guidance in different light forms. For example, in a normal standby state, the indicator 32 can flash to attract attention of the consumer. When a payment is guided, the indicator 32 can direct, by changing a color and by using a marquee, the consumer to make an electronic payment. A payment success and a payment failure can be displayed in different colors, to notify the payment result in a light form. The light form is not limited in this application.

In some implementations, the housing 1 includes a main body housing 13 and a circular top cover 14 fastened to the main body housing 13, the NFC module 31 and the indicator 32 are located below the top cover 14 and between the top cover 14 and the main body housing 13, and the top cover 14 is light-transmissive for light from the indicator 32 to transmit. The top cover 14 is provided with guiding text 141, to guide a payment method. For example, the guiding text 141 is an NFC identifier, etc.

In some implementations, the guiding text 141 is light-transmissive for the light emitted by the indicator 32 to transmit. When the indicator 32 guides a payment, the guiding text 141 is lit.

In some implementations, the checkout device 100 includes a circuit board 34, the indicator 32 is a plurality of LED beads fastened to the circuit board 34, and the plurality of LED beads are disposed in a circumferential direction of the circuit board 34. In some implementations, the checkout device 100 includes a light guiding ring 35 covering the LED beads.

In some implementations, the NFC module 31 is fastened to the top cover 14.

In some implementations, the main body housing 13 is provided with a cavity 130, the circuit board 34 is located in the cavity 130, the checkout device 100 includes a middle frame 36 and a transparent decorative cover 37, the middle frame 36 is fastened to the main body housing 13, the middle frame 36, the top cover 14, and the decorative cover 37 are fastened together, and the decorative cover 37 covers the top cover 14. The middle frame 36 is disposed so that the top cover 14 protrudes from an upper surface of the main body housing 13, to facilitate holding.

In some implementations, after the to-be-paid amount is manually entered on the display screen 2, the display screen 2 can display the to-be-paid amount of the product and/or the payment method guidance and/or the payment result.

In some implementations, the checkout device 100 can be connected to a code scanner, scan a two-dimensional code of the product through the code scanner to obtain the to-be-paid amount of the product, and display the to-be-paid amount on the display screen 2.

In some implementations, the checkout device 100 includes a speaker 5 located in the space enclosed by the housing 1. A sound output hole 131 is disposed on the housing 1 for a sound emitted by the speaker 5 to pass through. The speaker 5 can broadcast advertising information, the payment method guidance, the to-be-paid amount, payment completion, etc., can be more convenient to use, and can attract the consumer and improve checkout efficiency.

In some implementations, the sound output hole 131 is disposed on the main body housing 13.

In some implementations, the checkout device 100 includes a main board 61 and a battery (not shown in the figure) located in the space enclosed by the housing 1. The NFC module 31, the circuit board 34, the scanning apparatus 4, the speaker 5, and the battery are coupled to the main board 61.

In some implementations, the housing 1 includes a rear cover plate 15, the rear cover plate 15 is fastened to the main body housing 13, the main board 61 and the battery are located in space enclosed by the rear cover plate 15 and the main body housing 13, and the first support portion 111 and the second support portion 112 are connected to the rear cover plate 15.

In some implementations, the rear cover plate 15 can alternatively be integrally disposed with the main body housing 13.

In some implementations, the checkout device 100 includes a charging port 62 coupled to the battery, to charge the battery. In some implementations, the battery can be replaced. In some implementations, the battery may not be disposed, and the checkout device 100 supplies power through an external power supply.

Optionally, the charging port 62 can be of Type, etc.

The checkout device 100 includes a plurality of keys 63, and the keys 63 are disposed on a side edge of the checkout device 100, and can include a power on/off key, a volume adjustment key, etc.

Figure 6:
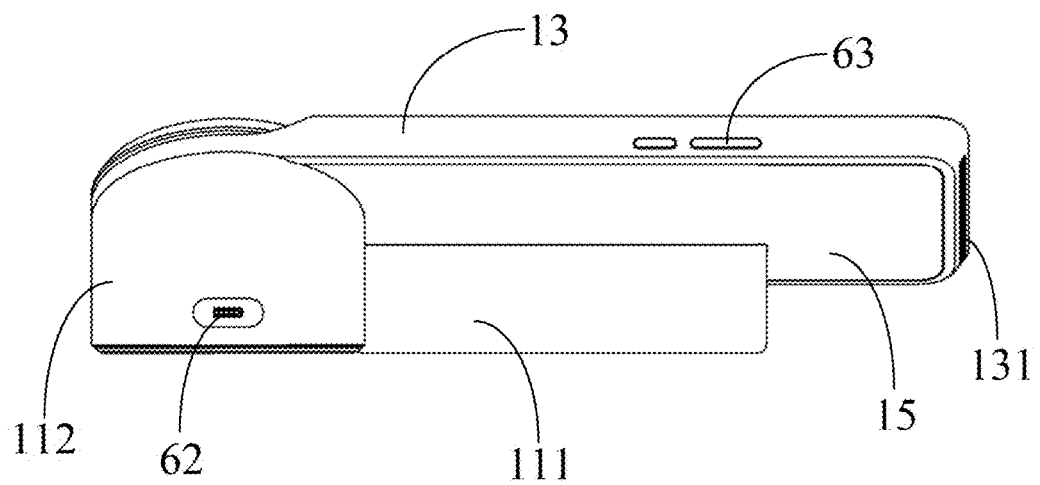
FIG. 6 is a rear view illustrating the checkout device shown in FIG. 1.
Figure 7:
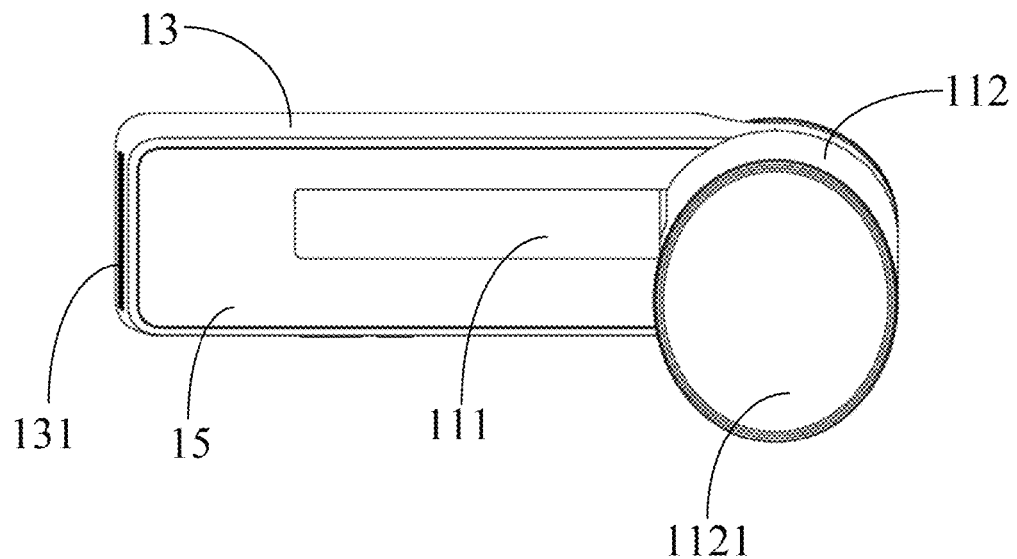
FIG. 7 is a bottom view illustrating the checkout device shown in FIG. 1.
Figure 8:
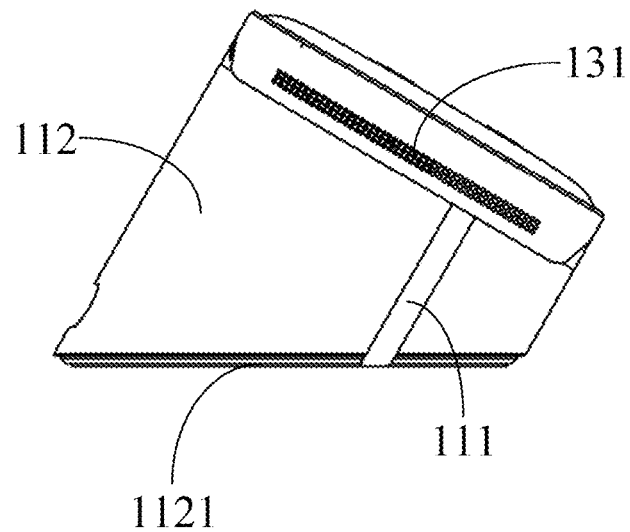
FIG. 8 is a side view illustrating a checkout assembly shown in FIG. 1.

As shown in FIG. 6 to FIG. 8, the support portion 11 includes the first support portion 111 and the second support portion 112 that are connected to the main body housing 13. The first support portion 111 is in a flat plate shape, to be supported on the countertop, and the second support portion 112 is columnar and includes a bottom surface 1121 disposed inclined, to be supported on the countertop.

In some implementations, the first support portion 111 and the display screen 2 are located on two opposite sides of the main body housing 13, and the second support portion 112 is located on one side of the first support portion 111, to improve stability when the checkout device 100 is placed on the countertop.

The second support portion 112 and the top cover 14 are located on two opposite sides of the main body housing 13.

In some implementations, two adjacent ends of the first support portion 111 are respectively connected to the main body housing 13 and the second support portion 112, to improve stability when the checkout device 100 is placed on the countertop. The first support portion 111 can alternatively be disconnected from the second support portion 112.

In some implementations, the display screen 2 and the NFC module 31 are sequentially disposed in a length direction of the main body housing 13, and a length direction of the display screen 2 is consistent with the length direction of the main body housing 13.

In some implementations, the checkout device 100 includes the scanning apparatus 4, and the scanning apparatus 4 is located at an end that is of the display screen 2 and that is far away from the NFC module 31. The scanning apparatus 4 can perform code scanning payment or face scanning payment, to provide more payment methods. The scanning apparatus 4 can be a camera, etc.

When the checkout device 100 in some implementations of this application is used, the to-be-paid amount can be manually entered on the display screen 2, or the two-dimensional code of the product can be scanned through the connected code scanner to obtain a price of the product. Then, the display screen 2 displays the payment method guidance and/or the checkout device 100 plays the payment method guidance in a voice way, and the consumer brings the electronic device close to the NFC module 31 to make an electronic payment.

A person skilled in the art can easily think of another implementation solution of the present application after considering the specification and practicing the invention disclosed here. This application is intended to cover any variations, uses, or adaptations of this application. These variations, uses, or adaptations follow the general principles of this application and include common knowledge or conventional technical means in the art that are not disclosed in this application. The specification and the implementations are considered as examples, and the true scope and spirit of this application are indicated by the following claims.

It is worthwhile to further note that the terms "include", "comprise", or any other variants thereof are intended to cover a non-exclusive inclusion so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the presence of additional identical elements in the process, method, product, or device that includes the element.

The above-mentioned descriptions are merely some implementations of this application, but are not intended to limit this application. Any modification, equivalent replacement, improvement, etc. made without departing from the spirit and principle of this application should fall within the protection scope of this application.

What is claimed is:

1. A checkout device, comprising:
   a housing, comprising a support portion for support of the housing on a countertops wherein:
   the housing comprises:
   a main body housing; and
   the support portion comprises:
   a first support portion and a second support portion, wherein the first support portion and the second support portion are connected to the main body housing, wherein the first support portion is in a flat plate shape, and wherein the second support portion is columnar and comprises:
   an inclined bottom surface;
   a display screen, wherein the display screen is fastened to the housing, wherein, when the checkout device is used, the display screen faces a consumer, and wherein, when the support portion is positioned on the countertop, the display screen is inclined relative to a vertical direction; and
   a near-field communication (NFC) module, wherein the NFC is located in a space enclosed by the housing, and wherein the NFC is located to permit an electronic device to perform an electronic payment.

2. The checkout device of claim 1, wherein two adjacent ends of the first support portion are respectively connected to the main body housing and the second support portion.

3. The checkout device of claim 1, wherein the display screen and the NFC module are sequentially disposed lengthwise with respect to the main body housing, and a lengthwise orientation of the display screen is consistent with a lengthwise orientation of the main body housing.

4. The checkout device of claim 3, comprising:
   an indicator, wherein the indicator forms a ring, and wherein emitted light surrounds the NFC module.

5. The checkout device of claim 4, wherein the housing comprises:
- a top cover fastened to the main body housing, wherein the NFC module is fastened to the top cover, wherein the NFC module and the indicator are located between the top cover and the main body housing, and wherein the top cover is transmissive to light emitted by the indicator.

6. The checkout device of claim 5, wherein the top cover comprises:
- guiding text, wherein the guiding text is transmissive to the light emitted by the indicator.

7. The checkout device of claim 1, comprising:
- a speaker located in the space enclosed by the housing; and
- a sound output hole, wherein the sound output hole is configured in the housing for a sound emitted by the speaker to pass through.

8. The checkout device of claim 1, comprising:
- a scanning apparatus, wherein the scanning apparatus is located at an end of the display screen farthest from the NFC module.

\* \* \* \* \*

UNITED STATES PATENT AND TRADEMARK OFFICE
CERTIFICATE OF CORRECTION

| | | |
|---|---|---|
| PATENT NO. | : 12,333,522 B1 | Page 1 of 1 |
| APPLICATION NO. | : 18/931970 | |
| DATED | : June 17, 2025 | |
| INVENTOR(S) | : Youchao Xu and Zhiyuan Chen | |

It is certified that error appears in the above-identified patent and that said Letters Patent is hereby corrected as shown below:

In the Claims

Column 6, Line 36, Claim 1, please replace "countertops" with -- countertop, --.

Signed and Sealed this
Eleventh Day of November, 2025

John A. Squires
*Director of the United States Patent and Trademark Office*